US006637319B1

(12) United States Patent
Vanini et al.

(10) Patent No.: US 6,637,319 B1
(45) Date of Patent: Oct. 28, 2003

(54) ADJUSTABLE HINGE FOR OVEN APPLIANCE

(76) Inventors: Angelo Vanini, Via F. Magnani N. 3, 40134 Bologna (IT); Jeffrey R. Klingeman, 1315 Old Taylor Trail, Goshen, KY (US) 40026

( * ) Notice: Subject to any disclaimer, the term of this patent is extended or adjusted under 35 U.S.C. 154(b) by 0 days.

(21) Appl. No.: 10/263,977

(22) Filed: Oct. 3, 2002

(51) Int. Cl.[7] .......................... A47J 37/00; A47J 37/04

(52) U.S. Cl. .......................... 99/467; 99/474; 99/483; 126/191; 126/194

(58) Field of Search .......................... 99/339, 340, 337, 99/338, 467–476, 483, 385; 126/19 R, 190, 191, 194, 197; 49/386; 16/284, 289, 267, 343, 374, 297; 219/400, 388

(56) References Cited

U.S. PATENT DOCUMENTS 1,979,210 A * 10/1934 Rogers .................... 99/467 X
3,150,658 A * 9/1964 Ferland .................... 16/191
3,889,654 A * 6/1975 Kauranen et al. ......... 16/289 X
4,082,077 A * 4/1978 Marfatia et al. ............ 126/197
4,143,592 A * 3/1979 Kuest et al. .................. 99/483
4,269,165 A * 5/1981 Wrotny et al. .............. 126/191
5,025,776 A * 6/1991 Hanley et al. ............ 16/289 X
5,916,353 A * 6/1999 Bennett et al. ........... 99/467 X
6,142,064 A * 11/2000 Backus et al. ............ 99/421 H
6,397,836 B1 * 6/2002 Pelletier et al. ........... 49/386 X
6,453,510 B1 * 9/2002 Cummins et al. ............. 16/343

* cited by examiner

*Primary Examiner*—Timothy F. Simone
(74) *Attorney, Agent, or Firm*—Moore, Hansen & Sumner

(57) ABSTRACT

An oven door hinge having an arm and a hinge assembly pivotally attached thereto. The hinge assembly has an elongated, channel-shaped housing that is configured to be removably and constrainingly received within a pocket of an oven door. The housing has two ends, with one end having a slotted, transverse end wall and the other end pivotally attached to the arm of the hinge at a first location. The hinge assembly also includes an elongated, channel-shaped link having two ends, with one end pivotally attached to the arm of the hinge at a second location, and the second end extending towards the transverse end wall of the housing. The link is configured to be retained within the channel of the housing so that it is able to shift positions with respect thereto as the hinge assembly is rotated. An elongated channel-shaped post having two ends is operatively connected to the other end of the link near the transverse end wall of the housing so that it extends through and beyond the transverse end wall of the housing, where it receives a spring element. An adjustment member that is attached to the other end of the post retains a spring element on the post. The adjustment member is provided with a threaded end and an adjustable stop to enable the length of the spring continuously varied within a predetermined range of values.

9 Claims, 3 Drawing Sheets

ADJUSTABLE HINGE FOR OVEN APPLIANCE

FIELD OF THE INVENTION

The present invention relates generally to oven door hinges. More specifically, the present invention relates to a counter-balance hinge for oven doors.

BACKGROUND OF THE INVENTION

Large, free standing cooking appliances or ranges have been in use for many years. Typically, they include a horizontal surface with one or more heating elements or burners and a large cooking chamber or oven. The front side of the oven is generally provided with a door with which to either close off or access the oven. The door is generally pivotally attached adjacent to the oven sidewalls that partially define the oven such that when the door is opened, it extends forwardly and generally horizontally from a bottom surface of the oven. Often, when the door is opened, it is used to support heavy food items. Unfortunately, oven doors are also sometimes misused, as a step or a chair. As a consequence, manufacturing standards have been created which require hinged oven doors to be able to support a greater weight than would be normally expected in order to partially address such consumer misuses of such doors. As a further consequence, modem oven doors and their attendant hardware, such as hinges and the like, are designed with such potential misuse in mind. The end result is an oven door that is robustly constructed and quite heavy.

One drawback with such ranges is that some oven doors are merely hinged onto the range. If one is not careful when opening the oven door, the door might slam open, and damage the hinges, jarring items on the top of the range and, perhaps, knocking them to the floor in the process. In an attempt to address this drawback, springs (tension and compression) have been added between the range and the oven door to provide a force to counteract the weight of the oven door as it opened. This reduces, to one degree or another, unfettered door slamming. The springs are not always able to provide a true counterbalance, however, especially where the motion of the door is more-or-less neutral. One further drawback is that in some instances the spring is not strong enough to effectively counteract the weight and momentum of the oven door. The door still slams open in this situation, only with less force. Conversely, another further drawback was that in some instances, the spring is too strong and the oven door does not remain open and tends to slam shut without initiation by the user.

To address these drawbacks, manufacturers have taken several approaches with varying degrees of success. The approach taken in most cases involves changing the length of the spring. An approach that has been used with tension-spring type hinge assemblies is to provide one end of the spring with a hook, which may be positioned in one of a plurality of attachment holes in a tab that is attached to the oven door frame, thus changing the tension on the spring and force exerted by the spring on the oven door (see, for example, U.S. Pat. No. 3,150,658). Unfortunately, adjustment of the spring is limited to a series of discrete coarse steps, and like the above-mentioned springs, it is not always possible to strike a true counterbalance. A door may still open too quickly or close of its own accord. Moreover, such an arrangement requires the use of a very long spring and a hinge assembly that must be bolted or otherwise attached to an interior surface of the oven door. As such, it is not easily accessible for servicing or replacement.

Another drawback is that each hinge assembly is designed for a particular make and model of oven door having a predetermined weight. A hinge assembly designed for one make and model of an oven door is not easily interchanged with different makes or models of oven doors.

An approach that has been used with compression-type hinge assemblies is to apply springs of different spring constants or to change the length of the shaft using different, predetermined lengths of rods. This can also be achieved by providing one end of the shaft with a retainer, which may be positioned and retained on the shaft by a transverse locking pin that engages one of a series of transverse holes in the shaft (see, for example, U.S. Pat. No. 4,269,165). As with the aforementioned tension-type hinge assemblies, however, a drawback with such an arrangement is that adjustment of the compression spring is limited to a series of discrete coarse steps and it is generally not really possible to precisely adjust the length of the shaft to strike a true counterbalance.

Another drawback with such an arrangement is that the rods and the retainer are comparatively difficult and expensive to fabricate. In addition, they require specialized tools and skills to assemble and connect one to each other. In addition, in order to fully utilize such an arrangement, a great number of differently sized components would have to be stocked and readily made available.

It will be appreciated, then, that true counterbalancing of an oven door is difficult to achieve. It becomes significantly more difficult for hinges that are intended to be used on a variety of different makes and models of ranges, or hinges that are intended to be used in retrofitting applications. This is because many manufacturers of ranges do not fabricate their own oven door hinges. Rather, they obtain their hinges from third parties. Even though the oven doors of differently manufactured ranges may have the same exterior dimensions, they may not have the same weight. Thus, a situation can occur where a non-adjustable or coarsely adjustable hinge may perfectly counterbalance an oven door made by one manufacturer and fail to counterbalance a comparably sized oven door made by another manufacturer.

An additional drawback, common to both of the aforementioned types of hinges, is that a part of the hinge assembly projects through the interior surface of the oven door. Moreover, the amount of the extension changes as the door is moved between its open and closed positions. Therefore, the door must include a slot or aperture to accommodate this portion of the hinge assembly, and this can weaken the strength of the door. The slot can also become filled with debris, which may affect the operation of the door as well as prove difficult to clean.

It will be appreciated, therefore, that there is a need for an oven door hinge assembly that is lightweight and easy to manufacture. There is also a need for a door hinge assembly whose working components are able to fit substantially within predetermined spaces of an oven door and a range. There is also a need for an oven door hinge assembly that can be used with a variety of differently sized oven doors. And there is a need for a hinge assembly that can be modified so that it can be used to effectively counterbalance a range of oven doors manufactured for a variety of cooking appliances.

SUMMARY OF THE INVENTION

Briefly, the present invention comprises a hinge for use with a range having an oven and an oven door. The hinge comprises an arm and a hinge assembly that is pivotally attached thereto. The arm includes a first member and a second member, the first member being designed and arranged to be removably secured to the body of the range and the second member being designed and arranged to pivotally support the hinge assembly. The hinge assembly is preferably configured to be removably attached to the oven door and is also designed so that it allows the motion of the door to be substantially torque neutral as it moves between open and closed positions. The hinge assembly includes a biasing element and an adjustment member that provide a variable force that counterbalances the weight of the oven door.

More specifically, the first member of the arm is preferably configured to be inserted into and seated within a pocket or slot in the range in a restrained relation, preferably adjacent the lower edge of the oven. When the first member is in this seated position, the second member will extend outwardly and downwardly from the range by a distance that is sufficient to allow the hinge assembly and an attached door to pivot freely thereabout, such that the door can move between an oven sealing or closed position and an oven access or open position. The second member includes first and second transverse apertures that are collaterally aligned with respect to each other, and which pivotally support different portions of the hinge assembly.

The hinge assembly preferably comprises an elongated generally u-shaped housing, an elongated generally u-shaped link, a biasing element, and a generally u-shaped post with an adjustable stop. The elongated u-shaped housing has a first end and a second end, and comprises a rear wall, opposing sidewalls and an end wall. The first end of the housing is pivotally attached to the hinge arm by a pin or pintle, which is inserted through apertures in the sidewalls adjacent the first end of the housing and through the first aperture in the hinge arm. The first end of the housing also preferably includes a slot that extends partially up the rear wall and which is preferably configured to freely admit a portion of the hinge arm as the u-shaped housing is pivoted about the pin. The second end of the housing preferably includes a transverse end wall having a slot that is sized to freely admit the post and allow movement with respect thereto. The transverse end wall also serves to support one end of the biasing element.

The elongate u-shaped link of the hinge assembly also preferably has a first end and a second end, and further includes a front wall and opposing sidewalls. The u-shaped link is preferably pivotally attached to the hinge arm by a second pin or pintle, which is inserted through apertures in the sidewalls adjacent the first end of the u-shaped link and through the second aperture of the hinge arm, which is preferably spaced above and slightly to the rear of the first aperture. The u-shaped link is also preferably configured so that it may be positioned between the sidewalls of the u-shaped housing and movable with respect thereto in a constrained manner as the hinge assembly is rotated about the pintles. At the second end of the u-shaped link, the sidewalls are preferably provided with apertures or through holes that are configured to receive a crossbar, which is used to operatively connect the u-shaped link to the post.

The elongated, generally u-shaped post preferably has first end and second ends, and comprises a rear wall and opposing sidewalls. The sidewalls of the first end of the u-shaped post are preferably provided with slots or notches that are configured to engage the crossbar that is inserted into the sidewall apertures of the u-shaped link. The u-shaped post is also configured so that it may be positioned between the sidewalls of the u-shaped link. The sidewalls at the second end of the post likewise provided with apertures or through holes that are configured to engage a crossbar that operatively connects the post to the adjustment member. It will be appreciated that the above-mentioned generally u-shaped housing, link, and post are not only lightweight and strong, but are also less expensive to manufacture than solid core components.

The adjustment member preferably comprises an elongated shaft having first and second ends. The first end is preferably provided with a transverse aperture that is sized to accept the crossbar that is inserted through the apertures in the second end of the u-shaped post. The second end of the shaft is preferably threaded. Preferably, the adjustment member also comprises an adjustable stop that is used to vary the effective working length the u-shaped post. In use, a spring is positioned over the u-shaped post such that one end abuts the transverse end wall of the u-shaped housing. The adjustable stop is then positioned on the threaded end of the adjustment member and the nut is tightened or loosened to the desired degree. Thus, the hinge may be adjusted to counterbalance an oven door.

Accordingly, an object of the invention is to provide a hinge that can be adjusted to counterbalance an oven door.

Another object of the invention is to provide a hinge that can be easily installed on an oven, without the need for specialized tools or training.

Another object of the present invention is to increase the utility of an oven door hinge so that it may be used in a variety of differently sized oven doors.

A feature of the present invention is that the hinge can be infinitely adjusted between a predetermined range of values.

Another feature of the invention is that the hinge assembly can be removably attached to an oven door without having any parts protruding through the inner surface of the oven door.

An advantage of the hinge of the present invention is that it may be easily adjusted without the need for specialized tools of skills.

These and other objects, features and advantages of the present invention will become apparent from the following detailed description thereof taken in conjunction with the accompanying drawing, wherein like reference numerals designate like elements throughout the several views.

DESCRIPTION OF THE PREFERRED EMBODIMENT

Figure 1:
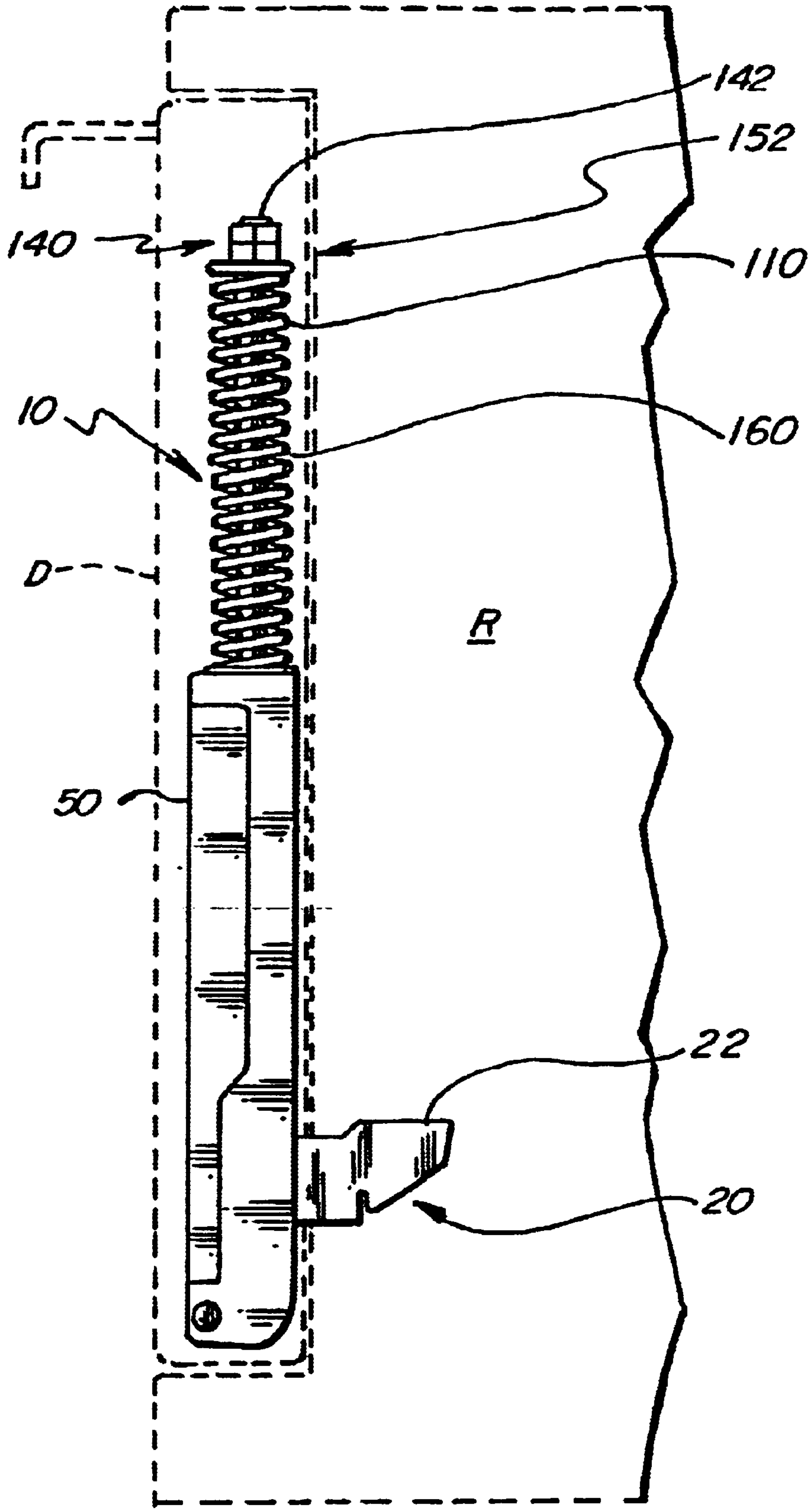
FIG. 1 is a side plan view of a preferred embodiment of the present hinge assembly integrated within an oven door (shown in phantom) and interconnected to an oven range R (partially shown in phantom)

Referring to FIG. 1 the hinge or hinge assembly 10 of the present invention is depicted as it may be used to attach an oven door D to a range R (both at least partially shown in phantom). As can be seen, the hinge 10 includes an arm 20 and a hinge assembly 40. The arm 20 is operatively connected to the range R by inserting a range engaging member 22 into a pocket and seating it therein (not shown). As can be seen, the hinge assembly 40 includes an elongated housing 50 and a biasing element 160, which is retained onto the hinge assembly 40 by a post 110 that extends from the elongated housing 50. The upper end of the post 110 is provided with an adjustment member 140 that includes a threaded shaft 146 on to which an adjustable stop 152 is threaded. Preferably, the adjustable stop 152 comprises a retainer or washer 154, and a pair of nuts 156, 158. As will be discussed below, the adjustable stop 152 is used to change the effective working length of the post 110, which changes the torque exerted by the biasing element 160 on the hinge arm 20, which resists the torque exerted by the weight of the oven door D as it pivots about the pintles 68, 96 of the hinge 10.

Figure 2:
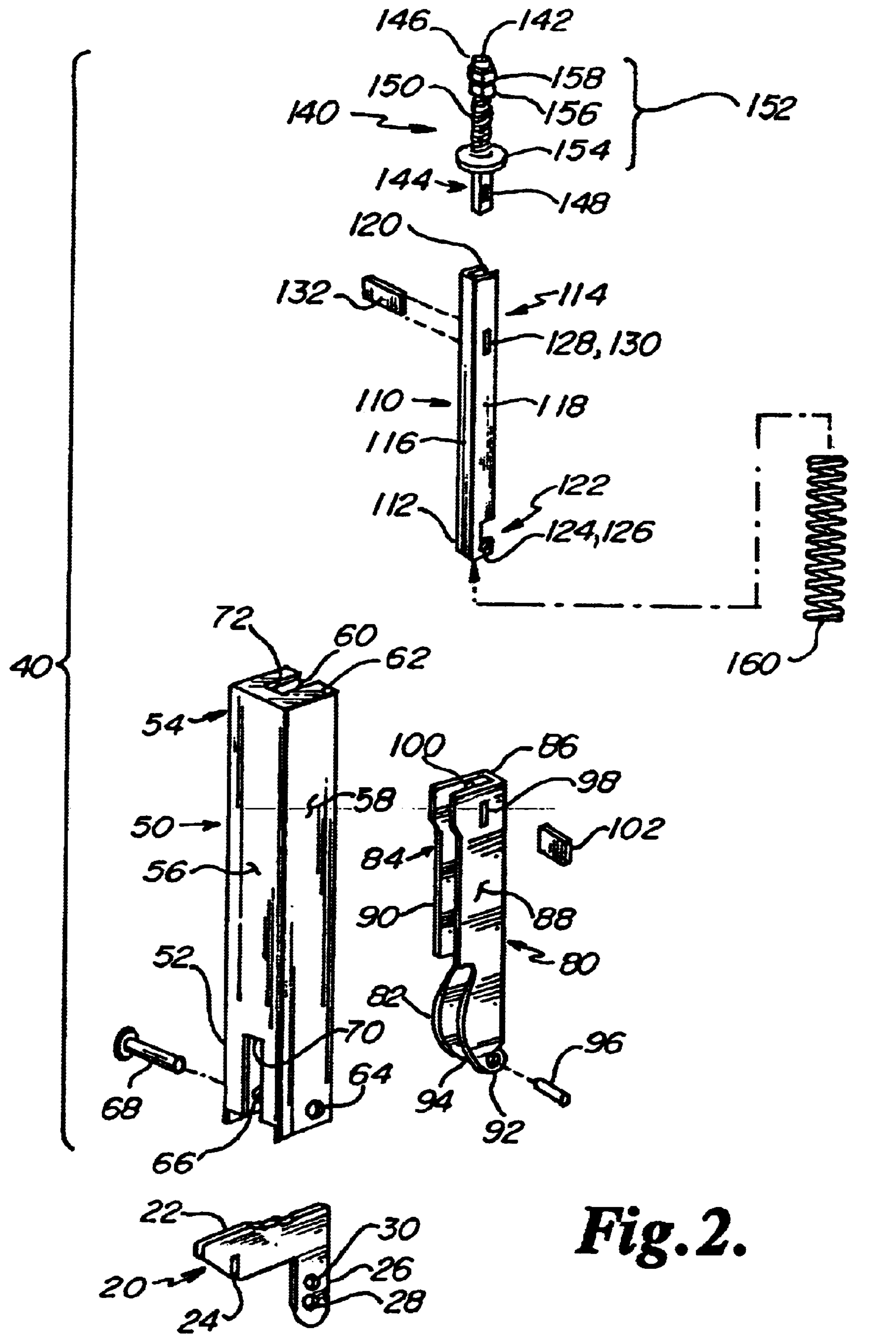
FIG. 2 is a exploded view of the hinge assembly shown in FIG. 1 illustrating internal components of the hinge.

Referring now to FIG. 2, the hinge 10 will now be discussed in greater detail, starting with the arm 20. The arm 20 includes a first member 22 and a second member 26, with the first member 22 designed and arranged to be removably secured to the housing of a range R, preferably within a pocket or predetermined space (not shown). In use, the first member 22 is inserted into the predetermined space and seated so that a notch 24 engages a portion of the range R (also not shown). The second member 26 of the arm 20 includes a first aperture 28 and a second aperture 30, with the first and second apertures 28, 30 collaterally aligned with each other and transverse to the plane of the second member 26. When the arm 20 is attached to a range and first member 22 is seated, the second member 26 will extend outwardly and downwardly by a distance that is sufficient to allow the hinge assembly 40 and an attached door D (see, FIG. 1) to pivot freely thereabout such that the door can move between an oven sealing or closed position and an oven access or open position.

The hinge assembly 40 is configured to be removably attached to an oven door D, preferably within a pocket having standardized dimensions (see, FIG. 1). The hinge assembly 40 comprises an elongated generally u-shaped housing 50, an elongated generally u-shaped link 80, a biasing element 160, a generally u-shaped post 110, and an adjustment member 140. The elongated u-shaped housing 50 has a first end 52 and a second end 54, and comprises a rear wall 56, opposing sidewalls 58, 60 and an end wall 62. The first end 52 of the housing 50 is pivotally attached to the hinge arm 20 by a pivot pin 68, which is inserted through apertures 64, 66 in the sidewalls 58, 60, respectively, and through the first aperture 28 in the hinge arm 20. The first end 52 of the housing 50 also includes a slot 70 that extends partially up the rear wall 56 and is configured to freely admit a portion of the hinge arm 20 as the housing 50 is pivoted about the pintle 68. The second end 54 of the housing 50 includes a transverse end wall 62 having a slot 72 that is sized to freely admit the post 110 and allow movement with respect thereto. The transverse end wall 62 also supports one end of the biasing element 160.

The elongated generally u-shaped link 80 of the hinge assembly 40 also has a first end 82 and a second end 84, and comprises a front wall 86 and opposing sidewalls 88, 90. The u-shaped link 80 is pivotally attached to the hinge arm 20 by a pintle or pin 96, which is inserted through apertures 92, 94 in the sidewalls 88, 90 adjacent the first end 82 of the link 80 and through the second aperture 30 of arm 20, which is spaced above and slightly to the rear of the first aperture 28. The u-shaped link 80 is also configured so that it may be positioned between the sidewalls 58, 60 of the u-shaped housing 50 and movable with respect thereto in a constrained manner as the hinge assembly 40 is pivoted about the pivot pins 68 and 96. The sidewalls 88, 90 adjacent the second end 84 of the u-shaped link 80 are provided with apertures or through holes 98, 100 that are configured to receive a crossbar 102, which is used to operatively connect the u-shaped link 80 to the first end 112 of the u-shaped post 110.

The elongated, generally u-shaped post 110 has a first end 112 and a second end 114, and comprises a rear wall 116 and opposing sidewalls 118, 120. The sidewalls 118, 120 of the first end 112 of the u-shaped post 110 are provided with a crossbar engagement member 122 that comprises slots 124, 126, which are configured to engage the crossbar 102 that is inserted into the sidewall apertures or through holes 98, 100 of the u-shaped link 80. The u-shaped post is also configured so that it may be positioned between the sidewalls 88, 90 of the u-shaped link. The sidewalls 118, 120 at the second end 114 of the post 110 likewise are provided with apertures 128, 130 that are configured to engage a crossbar 132 that operatively connects an adjustment member 140 to the post 110.

The adjustment member 140 comprises an elongated shaft 142 having first and second ends 144, 146, respectively. The first end 144 is provided with a transverse aperture 148 that is sized to accept the crossbar 132 that is inserted through the apertures 128, 130 in the second end 114 of the u-shaped post 110. The second end 146 of the shaft 142 is threaded 150. The adjustment member 140 also comprises an adjustable stop 152, which preferably comprises a retainer 154 or washer and a pair of threaded fasteners or nuts 156, 158. In use, a biasing element or spring 160 is positioned over the u-shaped post 110 such that it is held between the transverse end wall 62 of the u-shaped housing 50 and the retainer 154 of the adjustable stop 152. Preferably, the retainer 154 is held in position by a nut 156 that engages the thread 150 of shaft 142. As will be appreciated, the nut 156 permits the length of the post 110 to be infinitely varied as it traverses the thread 150. The nut 156 may be locked into position by drawing a second nut 158 tightly against it. Thus, the hinge may be adjusted to counterbalance an oven door.

Figure 3:
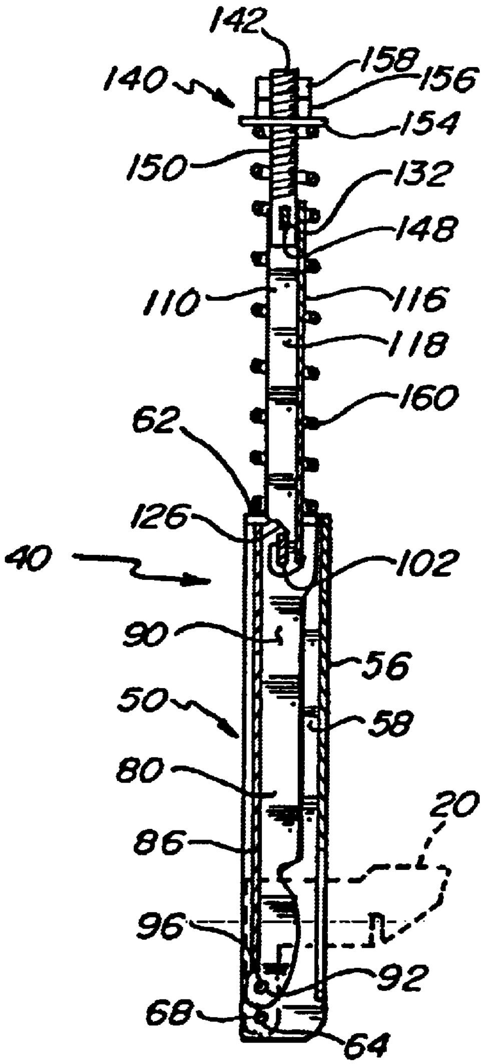
FIG. 3 is a partial, cross-sectional side view of the hinge assembly shown in FIG. 1, in which the hinge is shown in a vertical position.

Referring now to FIG. 3, a hinge assembly 40 is depicted as it may appear in use with an oven door when it is in a closed, vertical position. Here, the juxtaposition between the components of the hinge assembly can be seen. Note that the side and rear walls of the u-shaped housing 50 define a volume that is greater than the volume defined by the side and front walls of the u-shaped link 80. As will be seen, this difference in volume allows the link 80 to be substantially maintained within the housing 50 as the hinge assembly 40 is rotated between open and closed positions. The u-shaped link 80 is operatively connected to the u-shaped post 110 by a cross bar 102, which engages the apertures 98, 100 of the link 80 and the slots 124, 126 of the post 110. The adjustment member 140 is operatively connected to the post 110 by crossbar 132, which engages apertures 128, 130 in the post 110 and the aperture 148 in the adjustment member 140. As will be appreciated, the biasing element 160 is maintained in compression between the end wall 62 of the housing 50 and the adjustable stop, preferably by the retainer 154 and at least one nut 156 of the adjustable stop 152.

Figure 4:
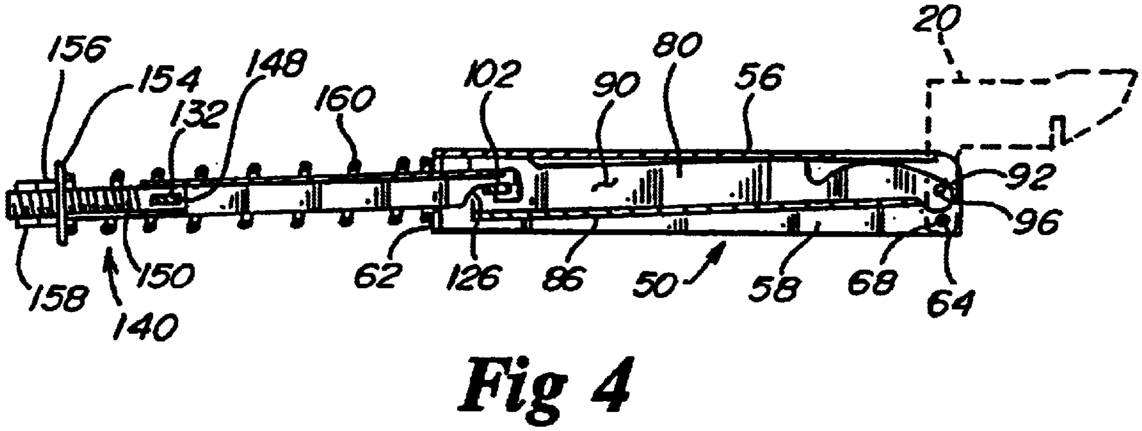
FIG. 4 is a partial, cross-sectional side view of the hinge assembly shown in FIG. 3, in which the hinge is shown in a horizontal position.

Referring now to FIG. 4, the hinge assembly 40 is depicted as it may appear in use with an oven door when it is in an open, horizontal position. Note that the juxtaposition between the components of the hinge assembly has changed from that of FIG. 3. That is, the link 80 has shifted away or retracted from the end wall 62 of the housing. In doing so, the biasing element or spring 160 is compressed more than it is when the hinge element 40 is in the vertical position. Thus, the hinge assembly 40 provides more force as an oven door is pivoted to an open, horizontal position.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims, which form a further part of the present application.

What is claimed is:

1. A hinge assembly for pivotally attaching an oven door to an oven of a range, the hinge assembly comprising:

a housing comprising a first end, a second end, opposing side walls and a transverse end wall, the first end of the housing pivotally attachable to a support arm at a first predetermined location;

a link comprising a first end, as second end, and opposing sidewalls, with the first end of the link pivotally attachable to the support arm at a second predetermined location, and with the link in substantial alignment with the housing;

a post comprising a first end, a second end, and opposing side walls, with the first end of the post operatively connectable to the second end of the link, wherein the second end of the post projects through the transverse end wall of the housing, the post in substantial alignment with the link;

an adjustment member operatively connected to the post, the adjustment member having an adjustable stop; and a biasing element interposed between the end wall of the housing and the adjustable stop;

wherein the biasing element exerts a force that urges the hinge assembly towards a vertical position; and, wherein the force exerted by the biasing element may be changed by manipulating the adjustable stop.

2. The hinge of claim 1, wherein the link substantially nests within the housing.

3. The hinge assembly of claim 1, wherein the adjustable stop is stepless.

4. The hinge assembly of claim 1, wherein the adjustment member comprises a threaded shaft, and wherein the adjustable stop comprises a threaded fastener.

5. The hinge of claim 1, wherein the biasing element is a spring.

6. A hinge for pivotally attaching an oven door to an oven of a range, the hinge comprising:

an arm, the arm connectable to a range; and a hinge assembly, the hinge assembly attachable to the arm and connectable to an oven door, the hinge assembly comprising:

a generally u-shaped housing comprising a first end, a second end, opposing side walls and a transverse end wall, the first end of the u-shaped housing pivotally attachable to the arm at a first predetermined location;

a generally u-shaped link comprising a first end, a second end, and opposing sidewalls, with the first end of the u-shaped link pivotally attachable to the arm at a second predetermined location, and with the u-shaped link nestably positionable with respect to the u-shaped housing;

a generally u-shaped post comprising a first end, a second end, and opposing side walls, with the first end of the u-shaped post operatively connectable to the second end of the u-shaped link, wherein the second end of the u-shaped post projects through the transverse end wall of the u-shaped housing;

an adjustment member operatively connected to the second end of the u-shaped post, the adjustment member comprising an adjustable stop; and a biasing element interposed between the transverse end wall of the u-shaped housing and the adjustable stop;

wherein the biasing element exerts a force that urges the hinge assembly towards a vertical position; and wherein the force exerted by the biasing element may be changed by manipulating the adjustable stop.

7. The hinge of claim 6, wherein the adjustable stop is stepless.

8. The hinge of claim 6, wherein the adjustment member comprises a threaded shaft, and wherein the adjustable stop comprises a threaded fastener.

9. The hinge of claim 6, wherein the biasing element is a spring.

* * * * *